United States Patent

Chambert

[11] Patent Number: 5,867,791
[45] Date of Patent: Feb. 2, 1999

[54] UP LINK MACRO DIVERSITY METHOD AND APPARATUS IN A DIGITAL MOBILE RADIO COMMUNICATION SYSTEM

[75] Inventor: George Chambert, Upsala, Sweden

[73] Assignee: Telefonaktiebolaget LM Ericsson, Stockholm, Sweden

[21] Appl. No.: 836,925

[22] PCT Filed: Nov. 22, 1995

[86] PCT No.: PCT/SE95/01396

§ 371 Date: May 23, 1997

§ 102(e) Date: May 23, 1997

[87] PCT Pub. No.: WO96/18277

PCT Pub. Date: Jun. 13, 1996

[30] Foreign Application Priority Data

Dec. 8, 1994 [SE] Sweden .................................. 9404275

[51] Int. Cl.[6] ....................................................... H04B 1/06
[52] U.S. Cl. ........................ 455/525; 455/560; 455/561; 455/524
[58] Field of Search ..................................... 455/436, 438, 455/439, 442, 443, 444, 560, 561, 524, 525; 370/331, 332, 333

[56] References Cited

U.S. PATENT DOCUMENTS

| | | |
|---|---|---|
| 5,088,108 | 2/1992 | Uddenfeldt et al. . |
| 5,109,528 | 4/1992 | Uddenfeldt . |
| 5,327,577 | 7/1994 | Uddenfeldt . |
| 5,539,749 | 7/1996 | Eul ........................................... 370/331 |
| 5,577,047 | 11/1996 | Persson et al. . |
| 5,583,913 | 12/1996 | Taketsugu ................................ 455/560 |
| 5,661,724 | 8/1997 | Chennakeshu et al. . |

FOREIGN PATENT DOCUMENTS

| | | |
|---|---|---|
| 643 542 | 3/1995 | European Pat. Off. . |
| H6-30460 | 2/1994 | Japan ............................... H04Q 7/04 |
| H6-261074 | 9/1994 | Japan .............................. H04L 12/56 |
| WO93/19537 | 9/1993 | WIPO . |
| WO94/05100 | 3/1994 | WIPO . |
| WO95/04419 | 2/1995 | WIPO . |

Primary Examiner—Reinhard J. Eisenzopf
Assistant Examiner—Makoto Aokz
Attorney, Agent, or Firm—Burns, Doane, Swecker & Mathis, L.L.P.

[57] ABSTRACT

A digital cellular mobile radio communication system includes a mobile station transmitting an information block and a set of base stations receiving information blocks corresponding to the transmitted information block at each base station in the set. This communication system contains an up link macro diversity system with a device in each base station for determining a quality measure representing the reliability of each respective received information block, and a decision device for choosing the received information block with the best quality measure as a common output information block of the set of base stations.

7 Claims, 2 Drawing Sheets

UP LINK MACRO DIVERSITY METHOD AND APPARATUS IN A DIGITAL MOBILE RADIO COMMUNICATION SYSTEM

TECHNICAL FIELD

The present invention relates to macro diversity in a digital mobile radio communication system, and in particular to an up link macro diversity method and apparatus in such a system.

BACKGROUND

In conventional digital cellular mobile radio communication systems a mobile station communicates with only one base station at each given time. However, recently it has been suggested to use so called macro diversity in such systems. This concept means that in the down link direction several base stations send the same information blocks to a mobile station, which combines the sent blocks into a final received block. In the up link direction a mobile station transmits an information block which is received at several base stations. The received blocks are transmitted to a common node in the land system, for example a mobile services switching center, where the received blocks are combined into a final received block. These procedures increase the reliability of the received information blocks, since the information has now travelled along different paths, one of which may distort the information less than the other.

A drawback of these up link diversity methods is that the received information blocks from several base stations have to be sent to the mobile services switching center, which reduces the capacity of the land system.

SUMMARY

An object of the present invention is therefore to provide an up link macro diversity method and apparatus in a digital cellular mobile radio communication system in which the capacity of the land system is increased by reducing the amount of information that has to be transferred between base stations and the next node of the land system of said communication system, for example a mobile services switching center.

One way to combine information blocks from several base stations is to use only the information from the "best" block. In such a case it would be unnecessary to transfer the information of discarded blocks between base stations and the mobile services switching center. Thus, the present invention is based on the idea that instead of transferring all the received blocks, it is sufficient to calculate a quality measure for each block and to transfer only these quality measures. The quality measures received by the mobile services switching center are then compared, and the base station from which the best quality measure was received is ordered to transfer its information block.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will now be described with reference to a digital cellular radio communication system of TDMA type. However, the invention is not restricted to such systems, but is also applicable to other digital cellular systems, such as CDMA systems.

Figure 1:
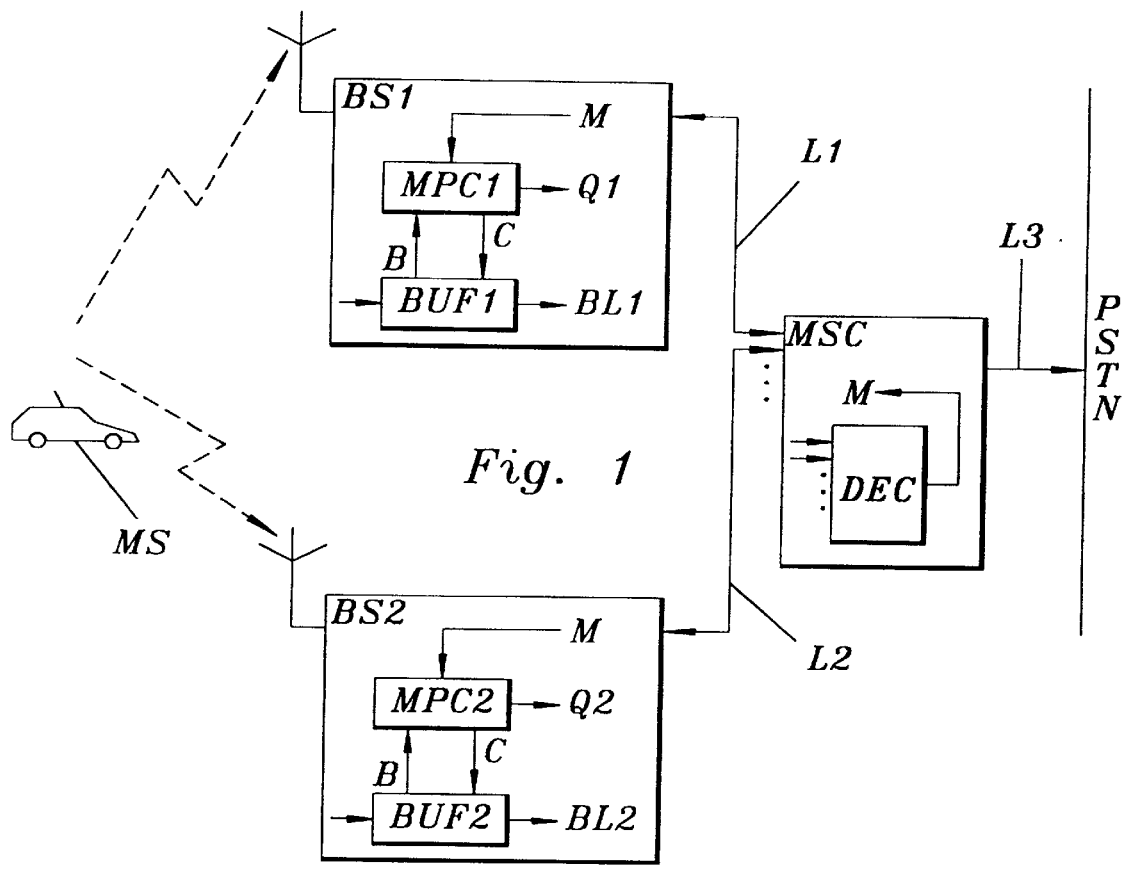
FIG. 1 is a block diagram of a part of a digital cellular mobile radio communication system illustrating the concepts of the present invention.

In FIG. 1 a mobile MS transmits information blocks, which are received at two base stations BS1 and BS2. The received signals are demodulated and decoded in accordance with conventional methods, and the resulting information blocks BL1 and BL2, respectively, are stored in respective buffers BUF1 and BUF2. In a preferred embodiment an information block is a frame, which typically corresponds to 10–40 ms of speech/data. Microprocessor controllers MPC1 and MPC2, respectively, retrieve relevant bits over bit retrieval lines B for calculating and outputting corresponding quality measures Q1 and Q2, respectively, of the stored blocks BL1 and BL2.

Here the concept quality measure does not necessarily mean just a single value, but could imply a sequence of values representing different aspects of the quality of the respective received block.

Examples of suitable quality measures are the number of bytes in a block that contained an error that was correctable, the number of bytes that contain non-correctable errors, or a combination thereof. Another quality measure is described in WO-94/05100, according to which a channel estimate is used to form a quality measure.

The quality measures Q1, Q2 are sent on respective lines L1, L2 to the mobile services switching centers MSC, which contains a decision means DEC that receives these signals. Decision means DEC may for instance comprise a micro processor. The dots below line L2 and below the input lines of decision means DEC imply that quality measures may be received from more than two base stations. In fact in its most general form the invention implies receiving quality measures Q1, Q2, . . . , QN from a set of corresponding base stations BS1, BS2, . . . , BSN.

Decision means DEC determines the best received quality measure and sends a message M to the microprocessor controller in the corresponding base station BS1 or BS2 over corresponding line L1 or L2. The microprocessor controller that receives this message, over a line C instructs its buffer to output its block (BL1 or BL2) to mobile services switching center MSC. On the corresponding output line (L1 or L2). The block received by mobile services switching center MSC is considered as the common output block from all the base stations in the set.

Figure 2:
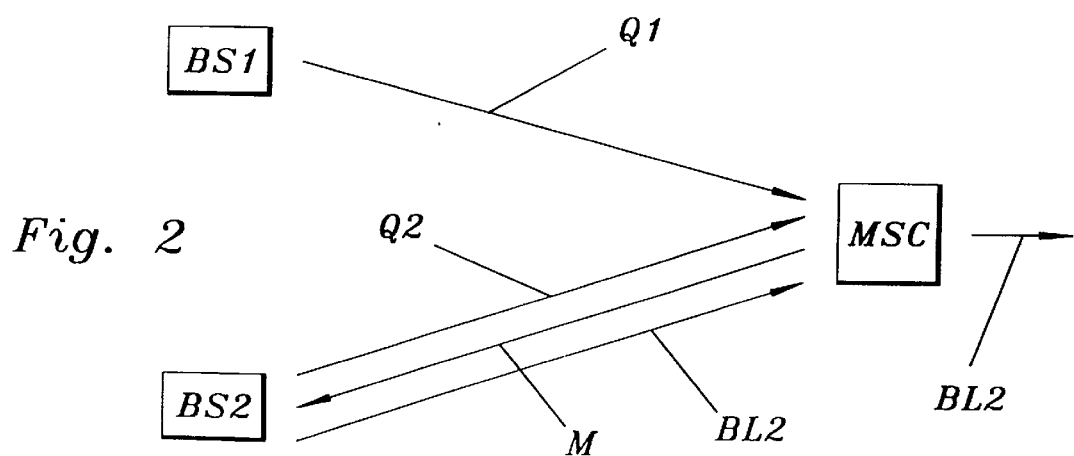
FIG. 2 is a diagram illustrating the signal transfer between base stations and a mobile services switching center operating in accordance with the present invention.

The above procedure is further illustrated in FIG. 2. Here quality measures Q1 and Q2 are received by mobile services switching center MSC from the base stations BS1 and BS2, respectively. The decision means in mobile services switching center MSC determines that Q2 is the best measure, which implies that block BL2 is the most reliable block. Therefore mobile service switching center MSC sends message M to base station BS2, in which microprocessor controller MPC2 instructs buffer BUF2 to output block 2 to mobile services switching center MSC, which in turn outputs block BL2 on line L3 to the public switched telephone network PSTN (see FIG. 1) as a common output from base stations BS1, BS2.

In the above description it has been assumed that lines L1, L2 are used for signalling (Q1, Q2, M) as well as information transfer (BL1, BL2). However, in practice there may be separate lines for signalling and information transfer.

Figure 3:
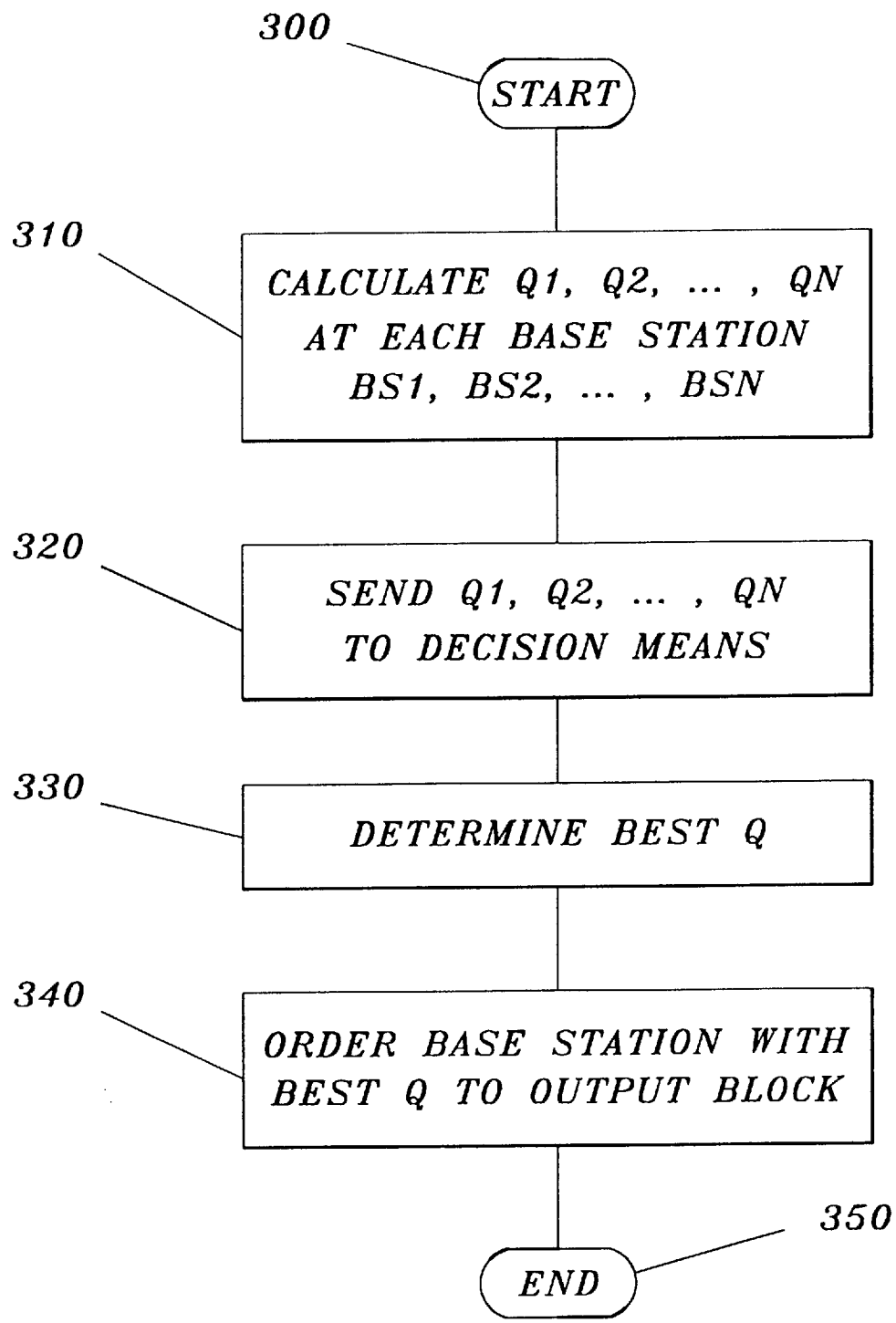
FIG. 3 is a flow chart illustrating the method in accordance with the present invention.

FIG. 3 is a flow chart illustrating the above described method. The routine starts in step 300. In step 310 the measures Q1, Q2, . . . , QN of the received information blocks are calculated at each base station BS1, BS2, . . . , BSN in the set. In step 320 the set of quality measures Q1, Q2, . . . , QN are sent to decision means DEC. In step 330 decision means DEC determines the best measure Q. In step 340 the base station that corresponds to the block with the best Q is instructed to output its block as a common output from the entire set of base stations. Finally the routine ends in step 350. This routine is repeated for each information block that is transmitted from the mobile station MS and received by the base stations in the set.

In the above described embodiment it has been assumed that decision means DEC is located in a mobile services switching center. However, this is not necessarily the case, since decision means DEC does not actually process any received information blocks, it only receives quality measures, determines the best measure and instructs a corresponding base stations to output its block. Therefore decision means DEC may be physically separated from mobile services switching center MSC. However, the actually transferred information blocks from base stations BS1, BS2 will be sent to mobile services switching center MSC.

In the above description it has also been assumed that only one information block is chosen from a set of received information blocks. However, it is within the scope of the same inventive idea to form (in element DEC in FIG. 1, for example) a combination of the best (in terms of quality measure) received blocks as a common output from a set of base stations. This would still reduce the amount of signaling, since not all received blocks have to be transferred to the mobile services switching center. For example, if the 3 best received blocks are transferred to the mobile services switching center, a combined block may be formed by setting each bit in this block equal to the value of the majority of the 3 corresponding transferred bits.

Furthermore, in this specification the present invention has been described with reference to a TDMA system. However, as noted above the invention is also applicable to a CDMA system.

It will be understood by those skilled in the art that various modifications and changes may be made to the present invention without departure from the spirit and scope thereof, which is defined by the appended claims.

What is claimed is:

1. An up link macro diversity method in a digital cellular mobile radio communication system, comprising the steps of transmitting an information block from a mobile station;

receiving information blocks corresponding to said transmitted information block at each base station of a predetermined set of base stations;

determining, at each base station in said set, a quality measure representing the reliability of each respective received information block;

selecting the best quality measure; and ordering only the base station corresponding to said best quality measure to output its received information block as a common output information block of said set of base stations.

2. The method of claim 1, further comprising the steps of: sending the quality measure from each base station to a decision means; and determining the best quality measure in said decision means.

3. An up link macro diversity method in a digital cellular mobile radio communication system, comprising the steps of transmitting an information block from a mobile station;

receiving information blocks corresponding to said transmitted information block at each base station of a predetermined set of base stations;

determining, at each base station in said set, a quality measure representing the reliability of each respective received information block;

determining a subset of quality measures containing only the best quality measures;

ordering only base stations corresponding to said subset of best quality measures to output their respective received information block; and combining said output information blocks into a common output information block of said set of base stations.

4. An up link macro diversity system in a digital cellular mobile radio communication system having a mobile station for transmitting an information block and a set of base stations for receiving information blocks corresponding to said transmitted information block at each base station in said set, said diversity system comprising:

means in each base station of said set for determining a quality measure representing the reliability of each respective received information block;

decision means for selecting the best quality measure and ordering only the base station corresponding to said best quality measure to output its received information block as a common output information block of said set of base stations.

5. The diversity system of claim 4, wherein said decision means is connected to each base station in said set for receiving said quality measures and determining the best quality measure.

6. The diversity system of claim 4, wherein the decision means is provided in a mobile services switching center (MSC).

7. An up link macro diversity system in a digital cellular mobile radio communication system having a mobile station for transmitting an information block and a set of base stations for receiving information blocks corresponding to said transmitted information block at each base station in said set, said diversity system comprising:

means in each base station of said set for determining a quality measure representing the reliability of each respective received information block;

means for determining a subset of quality measures containing only the best quality measures;

means for ordering only base stations corresponding to said subset of best quality measures to output their respective received information block; and means for combining said output information blocks into a common output information block of said set of base stations.

* * * * *